United States Patent [19]
Racki et al.

[11] 4,431,899
[45] Feb. 14, 1984

[54] CUTTING ASSEMBLY

[75] Inventors: Daniel J. Racki, Greensburg; Clark E. Swenson, Monroeville; William A. Bencloski, Herminie; Arthur L. Wineman, Greensburg, all of Pa.

[73] Assignee: The United States of America as represented by the United States Department of Energy, Washington, D.C.

[21] Appl. No.: 343,615

[22] Filed: Jan. 28, 1982

[51] Int. Cl.³ .............................................. B23K 27/00
[52] U.S. Cl. ........................ 219/121 LG; 219/121 FS
[58] Field of Search ................. 219/121 LG, 121 LN, 219/121 LQ, 121 LY, 121 LP, 121 LA, 121 LB, 121 L, 121 LM, 121 FS

[56] References Cited
U.S. PATENT DOCUMENTS

| 3,597,578 | 8/1971  | Sullivan ........................ | 219/121 LG |
| 4,000,391 | 12/1976 | Yeo ............................... | 219/121 LG |
| 4,048,464 | 9/1977  | Gale et al. .................... | 219/121 LG |
| 4,317,021 | 2/1982  | Walch et al. ................. | 219/121 LG |

*Primary Examiner*—C. L. Albritton
*Attorney, Agent, or Firm*—Edwin D. Grant; Stephen D. Hamel; Richard G. Besha

[57] ABSTRACT

A cutting apparatus includes a support table mounted for movement toward and away from a workpiece and carrying a mirror which directs a cutting laser beam onto the workpiece. A carrier is rotatably and pivotally mounted on the support table between the mirror and workpiece and supports a conduit discharging gas toward the point of impingement of the laser beam on the workpiece. Means are provided for rotating the carrier relative to the support table to place the gas discharging conduit in the proper positions for cuts made in different directions on the workpiece.

7 Claims, 7 Drawing Figures

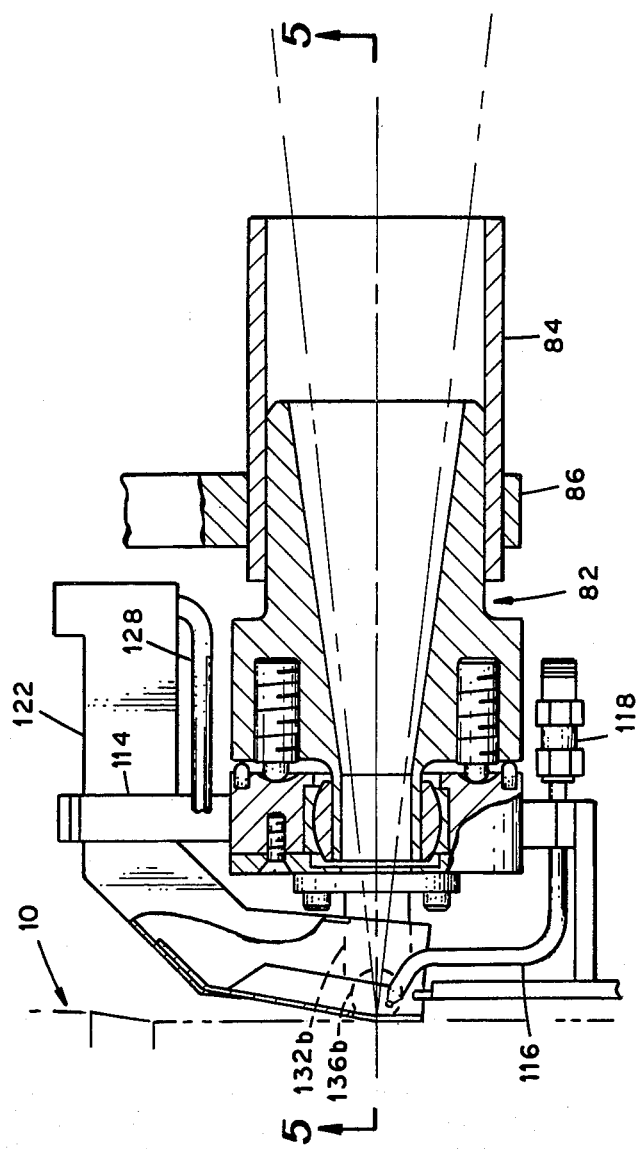

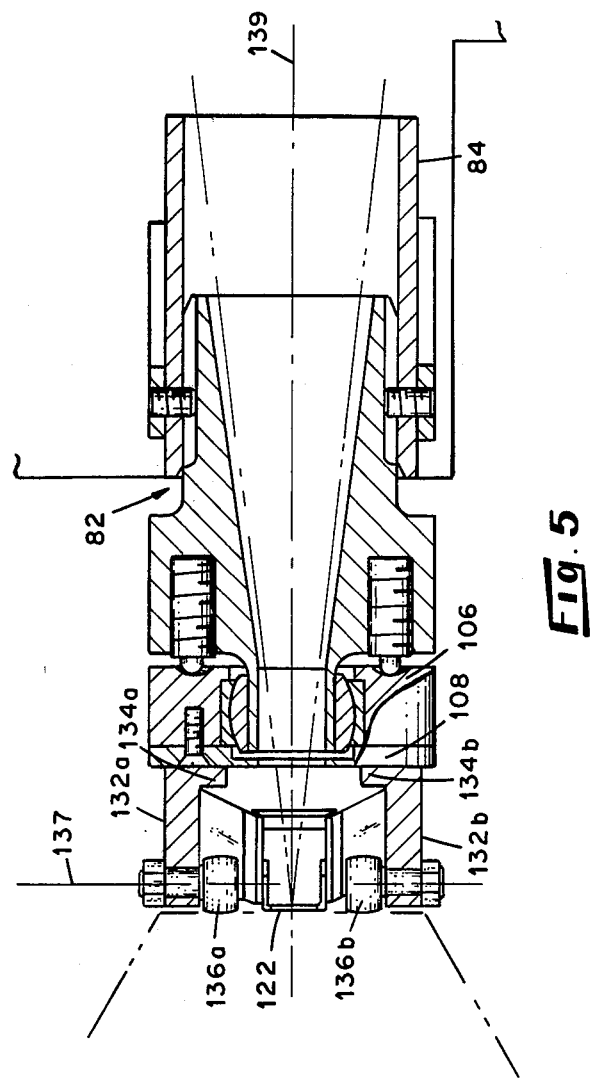

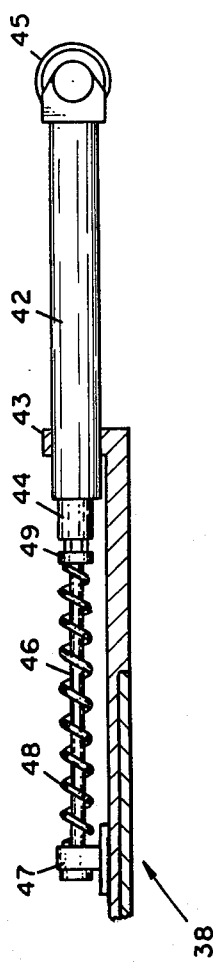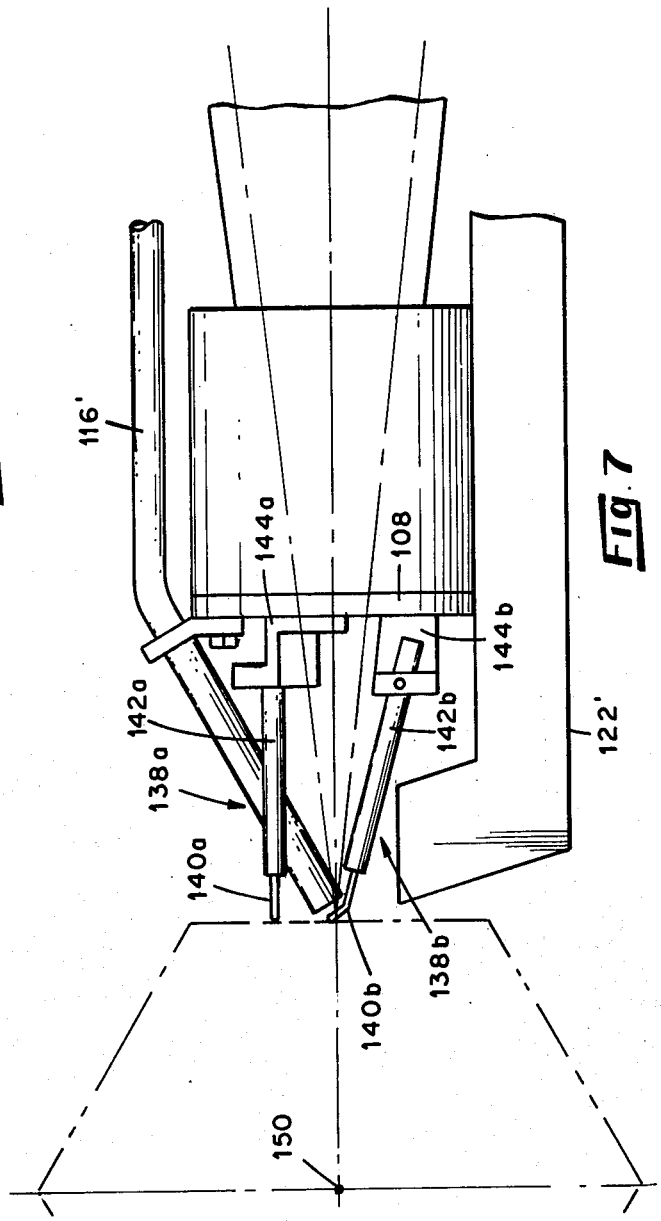

CUTTING ASSEMBLY

BACKGROUND OF THE INVENTION

The invention disclosed herein resulted from a contract with the U.S. Department of Energy and relates to a means for cutting a workpiece with a laser beam. More particularly, the invention concerns a laser-type cutting apparatus that can be conveniently operated from a point remote therefrom to make multiple cuts in different directions on a casing holding a plurality of tubes filled with nuclear fuel that is to be reprocessed for further use.

As shown in U.S. Pat. No. 4,000,391, a laser beam can be used to split a casing in which nuclear reactor fuel elements are held. It has been found, however, that to cut such a casing with a laser beam without damaging the fuel elements therein, the laser beam must have a focal point located at a predetermined position relative to the surface of the casing. Also in a laser-type cutting apparatus of the type disclosed in the aforesaid patent, a gas jet is discharged toward the point of impingement of the laser beam on a casing to assist cutting and remove debris from this point. It is advantageous to release the casing from the bundle of fuel elements held therein by first cutting off one end of the casing by means of a circumferential cut, then slitting the casing along its length, and finally cutting off the other end of the casing by making a second circumferential cut. It is also advantageous to remove non-reprocessible material from the bundle of fuel elements held in a casing by making cropping cuts (i.e., deep cuts that pierce components below the casing wall). Maintenance of the proper position of a laser beam focal point and the proper direction of gas jet discharge relative to the surface of a casing during these cutting steps is not possible with previously known apparatus. Furthermore, no known laser-type cutting assembly permits such cuts to be made by an automatic adjustment of components thereof to different positions for the different cuts.

SUMMARY OF THE INVENTION

It is therefore a broad object of the invention to provide an improved apparatus for cutting workpieces by means of a laser beam.

A more specific object of the invention is to provide a laser-type cutting assembly which can effectively make (1) both circumferential and longitudinal cuts in the casing of a nuclear reactor fuel rod having a hexagonal or other cross-sectional shape, and (2) cropping cuts to separate non-reprocessible components such as nozzle hardware from the fuel assembly of a fuel rod casing.

These objects and other advantages are achieved by preferred embodiments of the invention each comprising: means for supporting an elongate workpiece (such as a nuclear reactor fuel rod) for rotation about its longitudinal axis; a support table mounted for movement toward, away from, and lengthwise of the workpiece; a mirror mounted on the support table for directing a laser beam toward the workpiece; a carrier mounted on the support table between the mirror and the workpiece for rotation about the path of the laser beam between the mirror and workpiece; and means mounted on the carrier for directing a gas stream toward the point of impingement of the laser beam on the workpiece. Provision is made for releasably locking the carrier and workpiece-contacting rollers associated therewith in either of two rotational positions relative to the support table. Also mounted on the carrier is a suction duct for removing fumes and debris from the cutting area. In one embodiment of the invention, the focal point of the laser beam is maintained at a predetermined position relative to the surface of the workpiece by means of rollers mounted on the carrier and biased against the workpiece by spring means. In another embodiment of the invention, the laser beam focal point is maintained at a predetermined position relative to the workpiece by probes which are mounted on the carrier and which sense the position of the workpiece relative to the latter and control a drive means for moving the carrier and thus the mirror that focuses the laser beam.

DESCRIPTION OF THE DRAWINGS

FIG. 4 is a sectional plan view of the same embodiment of the invention, ilustrating the position of its components when a longitudinal cut is being made in the casing of a nuclear fuel rod assembly.

FIG. 5 is a sectional view of components of the same embodiment of the invention, taken along a vertical plane represented by line 5—5 in FIG. 4 in the direction indicated by arrows associated with the line.

FIG. 6 is a detailed plan view of components of the same embodiment.

FIG. 7 is a side elevation of a second embodiment of the invention.

DETAILED DESCRIPTION OF PREFERRED EMBODIMENTS OF THE INVENTION

Figure 1:
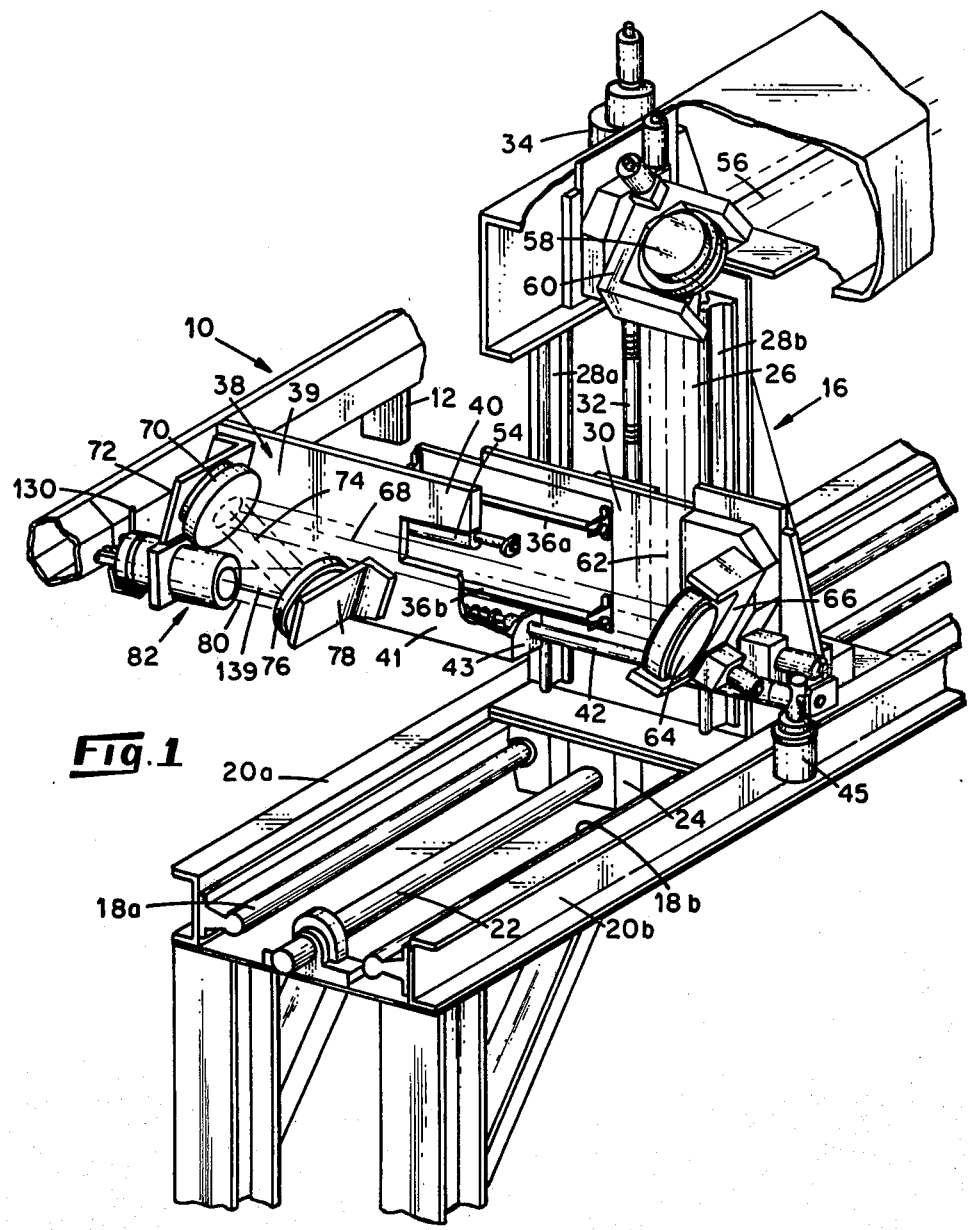
FIG. 1 is a perspective view illustrating a cutting apparatus in which the positioning means of the invention is used.

In FIG. 1, reference number 10 generally designates an elongate casing having a hexagonal cross-sectional shape and containing a plurality of tubes (not illustrated) filled with spent nuclear reactor fuel. The casing may be from reactors of different types, such as pressurized water reactors or a liquid metal fast breeder reactor. Each end of casing 10 is rotatably supported on the curved upper surface of a stanchion (only one of which is illustrated and designated by reference number 12 in FIGS. 1 and 2). A laser beam focusing assembly that will be described in detail hereinafter is supported adjacent casing 10 on a support table which is generally designated by reference number 38 in FIG. 1 and which is movable in three orthogonal directions by a support system generally designated by reference number 16. More specifically, support table 38 (which will be described in greater detail hereinafter) is movable toward and away from casing 10 along a horizontal axis perpendicular to the longitudinal axis of the casing (the X-axis), up and down along a vertical axis (the Y-axis), and back and forth along an axis which is parallel with the longitudinal axis of the casing (the Z-axis).

Support system 16 comprises a pair of horizontal support rails 18a, 18b respectively mounted on channels 20a, 20b of a fixedly positioned table, the longitudinal axes of the rails and channels being parallel with the longitudinal axis of casing 10. Slidably mounted on rails 18a, 18b and movable longitudinally thereof by a lead screw 22 is a main support block 24 which has a vertical plate 26 fixedly attached to, and extending upwardly from, the upper surface thereof. A pair of vertical support rails 28a, 28b are secured to plate 26 in spaced relation to each other, and a first support table 30 is slidably mounted on these rails and moved longitudinally thereof by a lead screw 32 turned by a drive motor 34 supported on the upper end of plate 26. Another pair of horizontal rails 36a, 36b are mounted on support plate 30 in vertically spaced relation to each, and the aforementioned support table 38 is mounted on these rails by means of slide blocks that are attached to the rear side of the table and therefore are hidden in FIG. 1. Table 38 comprises a rectangular portion 39 and two arms 40, 41 which project horizontally from the side of said portion 39 remote from casing 10 and which are spaced apart from each other in the vertical direction. A portion of arm 41 is broken away in FIG. 1 so that parts described hereinafter can be seen. Table 38 is moved along rails 36a, 36b, by a drive mechanism comprising: a cylinder 42 that extends through an aperture in a lug 43 attached to the free end of arm 41; a ram 44 (see FIG. 6) mounted in cylinder 42 for movement axially thereof; a drive motor 45 attached to cylinder 42 and table 30 and operable to move ram 44 axially in the cylinder; a long bolt 46 the threaded end of which extends into a hole in the free end of ram 44 and the other end of which is slidably disposed in an aperture in a lug 47 attached to the rear side of table 38; and a helical spring 48 disposed around the shank of bolt 46 and compressible between lug 47 and a nut 49 on the threaded end of bolt 46. It will be recognized that table 38 can be moved in either direction along rails 36a, 36b, by operating motor 45 to move ram 44 axially in cylinder 42, and that the arrangement of bolt 46, lug 47, spring 48 and nut 49 permits table 38 to move relative to and independently of ram 44 because the spring can be compressed between lug 47 and nut 49 when the lug slides on the bolt toward the nut. A linear variable differential transformer 54 is mounted on table 30 to measure the relative displacement between tables 30 and 38. This relative table measurement can be used to vary the laser power output and/or table speed.

In FIG. 1, a laser beam travelling in a direction parallel with the longitudinal axis of casing 10 is represented by broken line 56. A mirror 58 mounted in a U-shaped mount 60 attached to the upper end of plate 26 deflects this beam downwardly along path 62 to a second mirror 64 mounted in another U-shaped mount 66 attached to table 30. From mirror 64 the beam is reflected along a horizontal path 68 to a third mirror 70 mounted on an L-shaped mount 72 attached to support table 38. Mirror 70 reflects the beam along path 74 to a fourth mirror 76 mounted on another L-shaped mount 78 also attached to table 38. The beam is finally reflected by mirror 76 toward casing 10 along path 80, and this mirror also focuses the beam at a focal point adjacent the surface of the casing.

Figure 2:
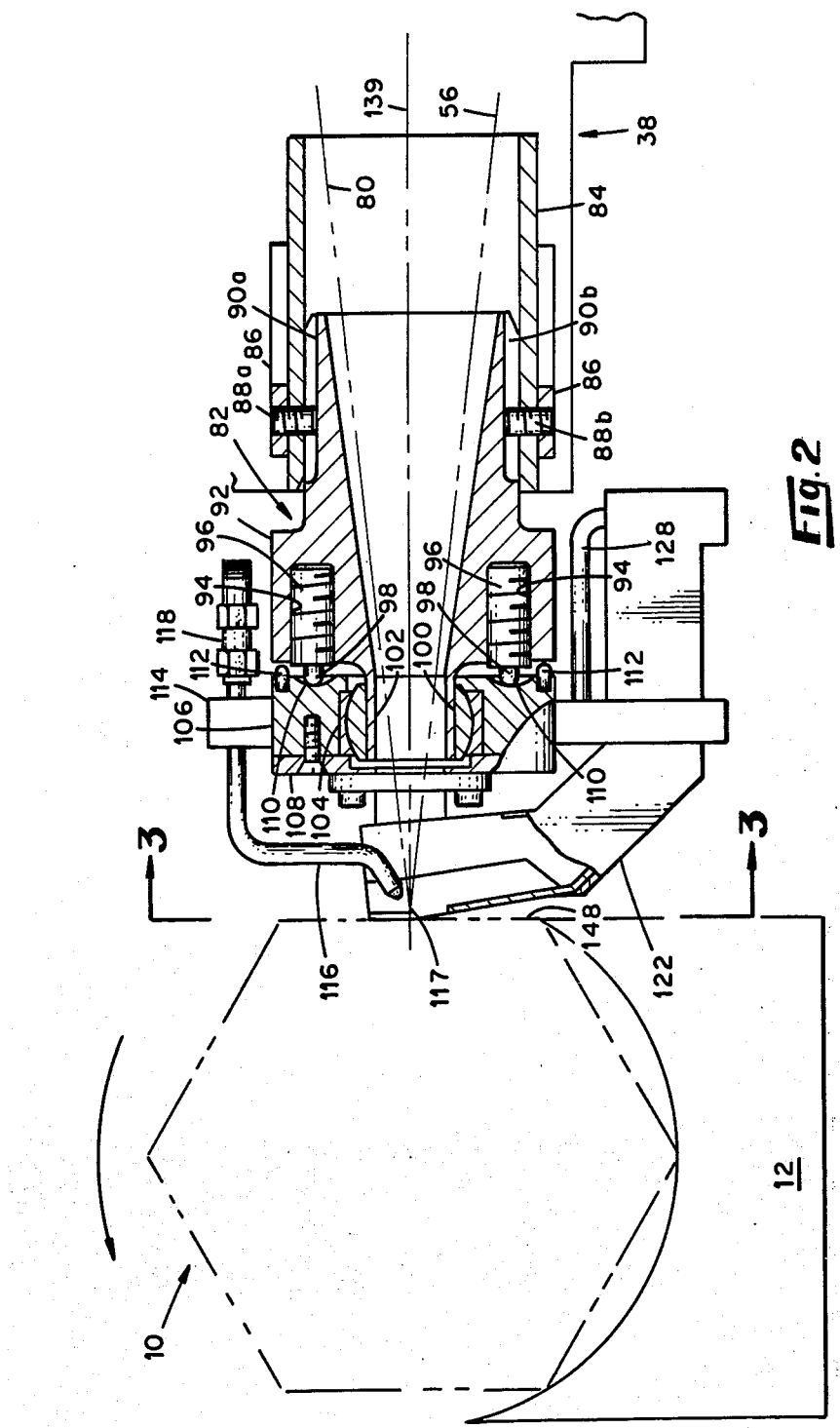
FIG. 2 is a sectional view of components of a first embodiment of the invention, illustrating their position when a circumferential cropping cut is being made in the casing of a nuclear fuel rod assembly.

As illustrated in FIG. 2, the reflected portion of laser beam 56 which travels along path 80 passes coaxially through a tube generally designated by reference number 82. One end of tube 82 is fitted within a second tube 84 mounted in a support means 86 which is attached to the portion of support table 38 next to casing 10. Set screws 88a, 88b extend through apertures in support means 86 and tube 84 and into slots 90a, 90b formed in tube 82, thereby permitting adjustment of the position of tube 82 relative to table 38. Tube 82 includes a flange 92 having four cylindrical holes 94 (only two of which are illustrated) formed at 90° spacing in the surface thereof which faces casing 10, and the housings 96 of spring-biased plunger 98 are respectively threaded into these holes. A bearing 100 having a spherically curved outer surface is mounted on the reduced diameter end 102 of tube 82 which projects from flange 92 toward casing 10. The spherical bearing race 104 matingly engages the outer surface of bearing 100 and fits within a counterbore formed in a ring 106, the bearing race being held in the counterbore by a retaining ring 108 attached to ring 106 by screws. A plurality of indents 110 are spaced 90° apart from one another circumferentially on the face of ring 106 next to flange 92 of tube 82, and the ends of the spring biased plungers 98 are respectively positioned in different ones of these indents depending upon the rotational position of ring 106 relative to tube 82. A plurality of pins 112 are also fixed in holes spaced apart from one another circumferentially of the face of ring 106 next to flange 92 and project from these holes into engagement with the flange. Ring 106 constitutes a rotatable carrier means for components that will presently be described.

Figure 3:
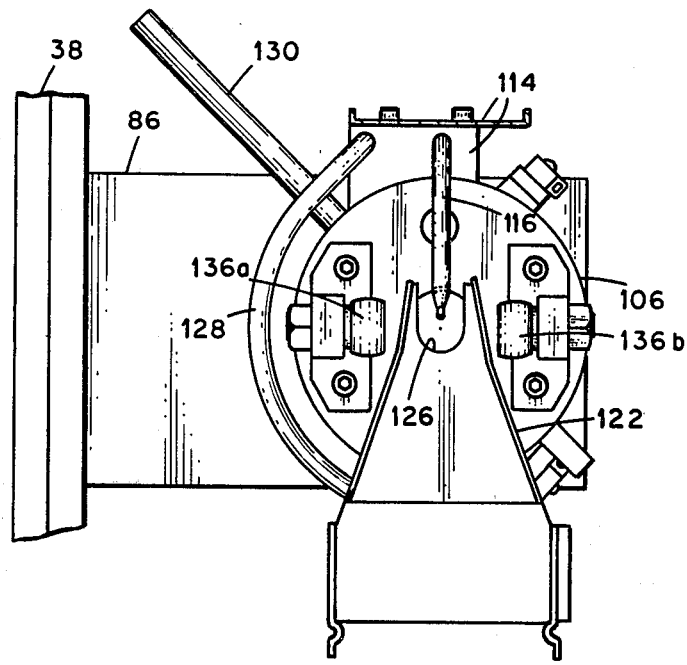
FIG. 3 is an end elevation of the same embodiment of the invention, taken along a vertical plane represented by line 3—3 in FIG. 2 in the direction indicated by arrows associated with the line.

As can best be seen in FIG. 3, a support means 114 formed of sheet metal is attached to and projects radially outward from the outer surface of ring 106. A conduit 116 is connected to the support means and extends therefrom to a point adjacent the focal point 117 (see FIG. 2) of the laser beam directed against workpiece 10, the other end of the conduit being connected by a coupling 118 (see FIGS. 2 and 4) to a suitable source for supplying air or other gas to the conduit under pressure. As can also be seen in FIG. 3, the side of a suction duct 122 which confronts casing 10 has a slot 126 formed therein to permit the aforementioned laser beam and gas discharged from conduit 116 to impinge on the casing. A second conduit 128 connects at one of its ends with the end of suction duct 122 remote from the discharge end of conduit 116, and the other end of this conduit 128 is connected to support means 114 and an aspirator pump (not illustrated). For a purpose that will be explained hereinafter, a lever arm 130 is fixed to and extends radially outward from the periphery of ring 106. Respectively disposed on opposite sides of the air inlet end of suction duct 122 and projecting from retaining ring 108 toward casing 10 are two support arms 132a, 132b (see FIG. 5). These arms are provided at one end with support flanges 134a, 134b fastened to retaining ring 108 by screws which pass through apertures in that ring and into holes in ring 106. Guide rollers 136a, 136b are respectively mounted on the free ends of support arms 132a, 132b for rotation about an axis 137 which intersects and is perpendicular to the longitudinal axis 139 of tube 82. By rotating ring 106 by means of lever arm 130 (as described hereinafter), the rotational axis 137 of rollers 136a, 136b can be moved to a different position relative to casing 10.

FIG. 7 illustrates a second embodiment of the invention which differs from the above-described embodiment only in that support arms 132a, 132b, guide rollers 136a, 136b, lug 47, and spring 48 are replaced by sensors 138a, 138b and an associated drive mechanism (which will be described hereinafter) as the means for maintaining table 38 (and components mounted thereon) in a predetermined position relative to casing 10. More particularly, in the second embodiment of the invention, each of the sensors 138a, 138b comprises a linear variable differential transformer type probe having a rod 140a, 140b which projects from a tubular housing 142a, 142b and is movable axially thereof. Housings 142a, 142b are respectively secured within apertures in brackets 144a, 144b attached to the retaining ring 108 previously described in connection with the first embodiment of the invention. Movement of either rod 140a, 140b relative to its housing 142a, 142b generates an analog electric signal that controls the motor of the type mounted on support table 30 in FIG. 1 and designated by reference number 45 therein. The second embodiment of the invention includes a gas discharging conduit 116' and a suction duct 122' which respectively correspond with conduit 116 and suction duct 122 of the embodiment illustrated in FIGS. 1–6.

OPERATION OF THE PREFERRED EMBODIMENT OF THE INVENTION

In FIG. 2, the direction of rotation of casing 10 about its longitudinal axis when a circumferential cut is being made in the casing by the first-described embodiment of the invention is shown by an arrow above the casing. During this circumferential cutting operation, the support block 24 illustrated in FIG. 1 is fixed in position adjacent one end of casing 10. Air or oxygen is discharged from conduit 116 toward the focal point 117 of the described laser beam during a cutting operation, in accordance with known procedure for laser cutting. Air is also drawn into suction duct 122 during a cutting operation by the aspirator pump connected to conduit 128, thus removing fumes and debris produced by melting of casing 10. As the hexagonal casing 10 rotates about its longitudinal axis, support table 38 moves toward and away from the axis along the X-axis of the cutting assembly while rollers 136a, 136b are maintained in engagement with the sides of the casing by spring 48 which resiliently biases support table 38 toward the casing. Hence mirror 76 carried by support table 38 is maintained at constant distance from casing 10, which of course keeps the focal point 117 of the beam at the same position relative to the surface of the casing. The distance of the end of conduit 116 from the surface of casing 10 is likewise maintained constant.

After a cut has been around casing 10 at one end thereof, rotation of casing 10 is stopped at a position which places the side 148 of the casing next to the cutting assembly in a vertical position. Lever arm 130 is then rotated 90° by engagement with any suitable means operable from the exterior of a housing in which the radiation-emitting casing 10 and the described cutting assembly are held for the protection of workers. This rotation of lever arm 130 turns ring 106 and the components mounted thereon about the longitudinal axis 139 of tube 82 from the position illustrated in FIG. 1 to the position illustrated in FIGS. 4 and 5. While casing 10 is held in fixed position on stanchions 12, lead screw 22 is next rotated in the direction that moves support block 24 along rails 18a, 18b toward the opposite end of casing 10, during which movement guide rollers 136a, 136b follow any change in position of the contacted side of the casing. After the laser beam has slit casing 10 along its length on three faces 120° apart, lever arm 130 is contacted by another means that rotates it and ring 106 back to the position illustrated in FIG. 1, whereupon a second circumferential cut can be made in the casing.

It will be recognized that when ring 106 is rotated the plungers 98 slide out of the indents 110 of ring 106 in which they are positioned in FIG. 2 and slide along the adjacent face of the ring until they snap into indents 90° from the detents in which the plungers were initially positioned. Thus plunger 98 serve as a means for releasably locking ring 106 in a first position wherein conduit 116 and suction duct 122 are properly aligned for circumferential cutting of casing 10 and a second position wherein the same components are properly aligned for longitudinal cutting of the casing.

When the second embodiment of the invention illustrated in FIG. 7 is used for cutting casing 10, rotation of the casing about its longitudinal axis or a curvature of the casing along its longitudinal axis will obviously tend to change the distance between the surface of the casing and mirror 76. However, when the surface of casing 10 moves toward or away from the casing axis represented by point 150 in FIG. 7, one or both of the plungers 140a, 140b will be moved relative to housings 142a, 142b, thereby generating an electric signal that causes motor 45 to translate ram 44 and support table 38 connected thereto in the direction of movement of the plunger or plungers to maintain a constant spacing between the surface casing 10 and mirror 76.

What is claimed is:

1. An assembly for cutting a workpiece with a laser beam, comprising:
    means for holding said workpiece in a predetermined position for cutting;
    a support table mounted for movement toward and away from said workpiece;
    a mirror mounted on said support table for directing a laser beam toward said workpiece;
    a tube mounted on said support table between said mirror and said workpiece, said laser beam being directed toward said workpiece through said tube;
    a ring rotatably mounted on the end of said tube that is disposed adjacent said workpiece;
    means mounted on said ring for directing a gas stream toward the point of impingement of said laser beam on said workpiece; and
    detent means associated with said tube and ring for releasably locking said ring on said tube in either of two rotational positions 90° apart.

2. The assembly of claim 1 wherein said detent means comprises a plurality of spring-biased plungers carried by said tube.

3. The assembly of claim 2 including:
    a suction duct mounted on said ring with its inlet end positioned adjacent the point of impingement of said laser beam on said workpiece.

4. The assembly of claim 3 including:
    guide rollers mounted on said ring on opposite sides of the inlet end of said suction duct; and
    means for resiliently biasing said support table toward said workpiece.

5. The assembly of claim 4 including a lever arm projecting radially from said ring for engagement with means located adjacent said workpiece for rotating said ring to different positions relative to said tube.

6. The assembly of claim 1 including:
    control means associated with said assembly for (1) sensing a change in the distance between said mirror and said workpiece, and (2) generating an analog signal in response to said change; and
    means responsive to said analog signal for moving said support table toward said workpiece if said distance increases and away from said workpiece if said distance decreases.

7. The assembly of claim 6 wherein said control means comprises a linear variable differential transformer probe mounted on said ring and contacting said workpiece.

* * * * *